July 28, 1964     S. ABRAMOVITZ     3,142,519
TILTING PAD THRUST BEARING
Filed Dec. 7, 1962
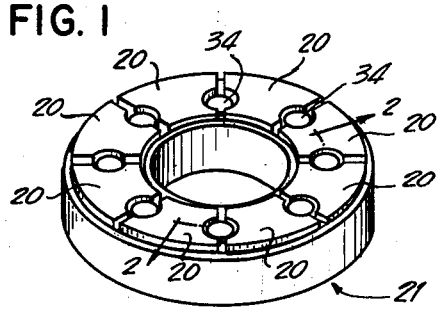
FIG. 1
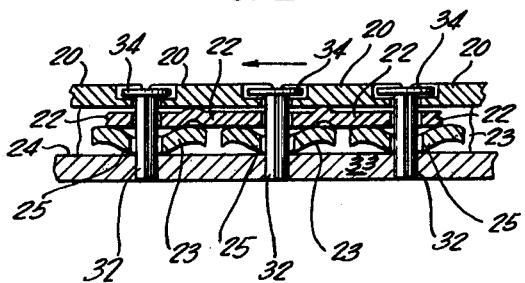
FIG. 2
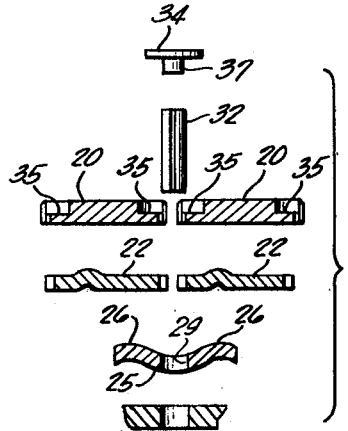
FIG. 3
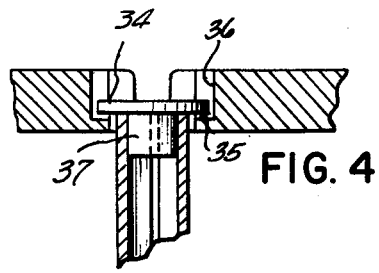
FIG. 4
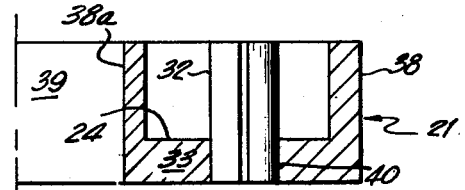
FIG. 5
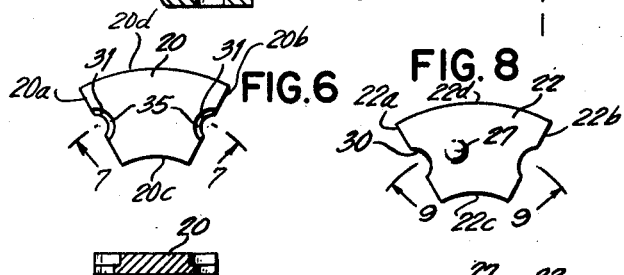
FIG. 6    FIG. 8
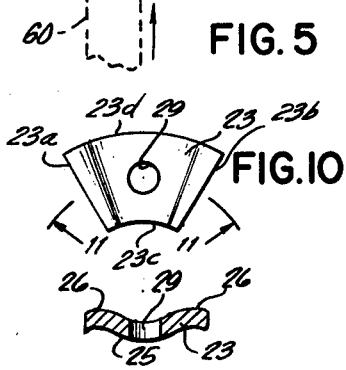
FIG. 10
FIG. 11
FIG. 9
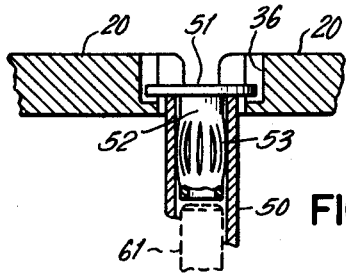
FIG. 7
FIG. 12
INVENTOR.
STANLEY ABRAMOVITZ
BY Charles Marks
ATTORNEY United States Patent Office 3,142,519
Patented July 28, 1964

3,142,519
TILTING PAD THRUST BEARING
Stanley Abramovitz, New York, N.Y., assignor to Industrial Tectonics, Inc., Fluid Film Bearing Division, a corporation of New York
Filed Dec. 7, 1962, Ser. No. 243,015
7 Claims. (Cl. 308—160)

This invention relates to an improved tilting pad thrust bearing.

Tilting pad thrust bearings are well known and are intended for operation as hydrodynamic bearings wherein a series of bearing shoes or pads are inclinable so as to permit a fluid lubricant to form a wedge-shaped film between them and a moving bearing surface. In the past, it has been the practice to provide means for adjusting the inclination of the bearing shoes or pads so that they will cooperate in distributing equally any thrust which may be imposed upon them by a bearing load. Thus, a conventional arrangement for accomplishing this purpose contemplates the employment of equalizing members disposed within the bearing housing and intended to permit the bearing shoes or pads to pivot or otherwise adjust themselves in the desired manner. However, the manufacture of the bearing shoes and equalizers, as well as their retention in proper position with respect to the bearing housing has heretofore presented a number of difficulties. Thus, manufacture of these members has been a time consuming, expensive and exacting procedure; and their assembly and retention has often involved the necessity of designing bearing shoes of complex form and equipped with numerous auxiliary retaining elements. Beyond this, the disassembly of such conventional bearings has been correspondingly arduous and time consuming.

The present invention is aimed at solving these problems. More specifically, it is an object of the present invention to provide an improved tilting pad thrust bearing having a minimum number of parts which are of simple and economical design.

Another object of the invention is to provide a tilting pad thrust bearing which has improved means for retaining its bearing shoes and equalizing members both in proper relation with respect to each other and also with respect to the bearing housing.

A further object of the invention is to provide a retaining means of the character indicated which is of simple design and which permits rapid assembly and disassembly of the bearing elements.

Other objects and advantages of the present invention will become apparent from the following description as read in connection with the accompanying drawing.

In the drawing:

FIGURE 1 is a perspective view of one embodiment of the invention;

FIGURE 2 is a cross-sectional view taken about the line 2—2 of FIGURE 1;

FIGURE 3 is a view similar to that of FIGURE 2 but showing a portion of the various elements depicted in FIGURE 2 in exploded position;

FIGURE 4 is an enlarged fragmentary cross-sectional view showing a pair of adjacent bearing shoes and the means for retaining them within their operative position with respect to the bearing housing and the equalizers;

FIGURE 5 is a fragmentary cross-sectional view showing in assembled position the bearing housing and a portion of the retaining means depicted in FIGURE 4;

FIGURE 6 is a plan view of a typical bearing shoe employed in the invention;

FIGURE 7 is a cross-sectional view taken about the line 7—7 of FIGURE 6;

FIGURE 8 is a plan view of a typical upper equalizer member employed in the invention;

FIGURE 9 is a cross-sectional view taken about the line 9—9 of FIGURE 8;

FIGURE 10 is a plan view of a typical lower equalizer employed in the invention;

FIGURE 11 is a cross-sectional view taken about the line 11—11 of FIGURE 10;

FIGURE 12 is a view similar to that of FIGURE 5 but showing a modified form of bearing shoe retaining means.

Throughout the various views similar reference numerals are employed to refer to similar parts.

The present invention utilizes a minimum of simple, easily formed and easily assembled elements which are adapted to provide an annularly disposed series of bearing shoes or pads capable of inclination so as to distribute a thrust load imposed thereon by a collar or other element rotating in a plane perpendicular to the axis of the bearing as, for example, in the direction of the horizontal arrow depicted in FIGURE 2. Such inclination is in accordance with the tilting accomplished in conventional equalized tilting pad thrust bearings. However, the construction of the various elements of the present invention and the means for retaining them in their operative position present important advantages of the invention.

Thus it will be seen in FIGURES 1 and 2 of the accompanying drawing that the tilting bearing shoes 20 are annularly located in a bearing housing generally designated by the numeral 21. The bearing shoes 20 are disposed upon a series of upper equalizers 22 and lower equalizers 23.

The lower equalizers 23 surmount a planar surface 24 provided in the housing 21. As can be seen in FIGURES 10 and 11, each of said lower equalizers 23 comprises a plate defined by radial edges 23a, 23b and concentric, inward and outward arcuate edges 23c, 23d. Each of said lower equalizers 23 is provided with an upwardly curved lower surface 25 located centrally of said plate. This lower surface 25 has a generally cylindrical curvature, the longitudinal axis of which is aligned radially of the axis of the bearing housing 21. In this position, each of said lower equalizers 23 makes line contact with the planar surface 24 and is permitted to incline in a direction perpendicular to a radius extending from the center of the bearing housing through the center of said lower equalizer.

The upper surface of each lower equalizer 23 is provided with two downwardly curved end elements 26 whose curvature is also generally cylindrical and aligned radially of the axis of the bearing housing. The end elements 26 are surmounted by the upper equalizers 22, which are also annularly disposed. As may be seen in FIGURES 8 and 9, each of said upper equalizers 22 includes a generally flat plate defined by radial edges 22a, 22b and concentric, inward and outward arcuate edges 22c, 22d. The upper surface of each of these flat plates in provided with a spherical projection 27 which may be formed by bumping or dimpling in the usual manner.

It will be noted from FIGURES 8 through 11, as well as from FIGURE 2, that each said lower equalizer is provided with a circular aperture 29 and each said upper equalizer is provided with arcuate recesses 30 on its edges 22a, 22b and medially of the inward and outward arcuate edges 22c, 22d. The upper equalizers 22 are arranged so that the arcuate recesses 30 in adjacent equalizers are disposed above and coaxially with the circular apertures 29 in a lower equalizer, as may be seen in FIGURE 2. The upper equalizers 22 are surmounted by the bearing shoes or pads 20, each of which is seated upon the spherical projection 27 presented by one of the upper equalizers 22. As may be seen in FIGURES 6 and 7, and also in FIGURE 2, each of the bearing shoes 20 is defined by radial edges 20a, 20b and concentric, inward and outward arcuate edges 20c, 20d. Each said bearing shoe 20 is of generally flat, plate-like form and is provided with a pair of arcuate recesses 31 formed on the radial edges 20c, 20d and medial of the inward and outward arcuate edges 20c, 20d. When assembled in operative position, these recesses 31 are disposed co-axially with the arcuate recesses 30 of the upper equalizers and circular apertures 29 of the lower equalizers.

An important feature of the invention resides in the means for retaining the bearing shoes 20, the upper equalizers 22 and the lower equalizers 23 in their assembled position within the bearing housing 21. Thus, as may be seen in FIGURES 2, 4 and 5 of the drawing, a series of pins 32 are received within the floor 33 of the bearing housing 21 and project longitudinally parallel to the axis of said housing 21. These pins 32 extend through the circular apertures 29 of the lower equalizers 23, and also through the adjacent arcuate recesses 30 in the upper equalizers 22 and into the adjacent arcuate recesses 31 in the shoes 20. At the exposed ends of each of the said pins 32, a flange 34 is disposed. As may be seen in FIGURE 4, the flange 34 extends above a step 35 provided in each of the arcuate recesses 31 in the bearing shoes 20 but said flange 34 does not extend to the level of the upper surfaces of said bearing shoes 20. These flanges 34 do not contact the surfaces of the steps 35 nor do said flanges contact the upright walls 36 of said recesses 31, thereby permitting each of the shoes 20 to pivot freely upon the spherical projections 27 and to adjust themselves vertically of the housing. At the same time however, the pins 32 and their flanges 34 retain the bearing shoes 20 and the upper and lower equalizers 22, 23 in their operative position within the housing 21, by obstructing any axial dislocation of the said shoes and equalizers which would accomplish their accidental disassembly from the housing.

As may be seen in FIGURES 3 and 4, each of the pins 32 is preferably formed as a slotted tube or rollpin, which is frictionally engaged with the neck 37 of the previously mentioned flange 34. It is to be understood, however, that other forms of pin and flange combinations may be employed. Thus, as can be seen in FIGURE 12 of the drawing, a pin 50 comprising a hollow tube may be frictionally engaged with a removable plug having a flange 51 and a tubular shank 52. This shank 52 includes a slotted portion 53 which is yieldably engageable with the internal periphery of the pin 50. The slotted portion 53 is normally expanded outwardly of the tubular shank 52 but when inserted within the pin 50 is compressed to the position depicted in FIGURE 12, said slotted portion 53, however, being springably urged into contact with the internal periphery of the pin 50.

Plugs of the kind described are commercially available. So also, the flange 34 and neck 37 may be comprised by a commercially available grommet which may be easily assembled and disassembled with the aforementioned rollpin by conventional means.

The bearing shoes 20 and upper and lower equalizers 22, 23, as well as the pins 32, are confined and protected from injury by the outer and inner walls 38, 38a of the housing 21. Said housing 21 is also provided with an axial bore 39 according to conventional practice, thereby permitting reception of a suitable shaft (not shown) which may be associated with any rotating surface such as a rotatable collar (not shown) supportable by the bearing shoes 20.

It will be seen from the foregoing that the present invention is composed of a minimum number of operative parts which are easily disposed in assembled and disassembled position as desired. For purposes of disassembly, it is to be noted that the housing 21 is provided with a series of apertures 40 which receive the pins 32 and frictionally retain them. When desired, said pins 32 may be urged out of said apertures 40 thereby releasing the bearing shoes 20 and equalizers 22, 23 so as to permit disassembly from the housing. Thus, for example, a suitable percussion tool such as a punch 60 may be employed to exert an impact upon the bottom of each pin 32, as in the direction indicated in FIGURE 5 of the drawing, so as to accomplish the removal of the pin 32 and the flange 34 and neck 37 engaged with the pin. By removing each of the pins 32 in this manner, all of the bearing members within the housing may be readily removed. Thereafter, for purposes of reassembly, it is only necessary to replace the equalizers and bearing shoes within the housing and re-engage the pins 32 (containing their flanges 34 and necks 37) with the apertures 40, the pins 32 being frictionally engageable with said apertures 40.

It is also to be understood that the pins may be permitted to remain engaged with the apertures 40 and that only the flanges need be removed from said pins. Thus, for example, as indicated in FIGURE 12 of the drawing, a punch 61 may be inserted within the pin 50 and may be brought into contact with the bottom of the tubular shank 52 so as to urge it together with the flange 51 out of said pin 50. After this operation is performed upon each pin 50, the bearing shoes and equalizers may be disassembled from the housing leaving only the pins engaged therewith. Reassembly of the various bearing elements is facilitated since the pins may be utilized as guides associated with the equalizers and bearing shoes, the tubular shanks 52 being reinsertable into each pin 50 by manual pressure.

It is therefore plain that the foregoing features permit rapid assembly and disassembly for manufacturing and maintenance purposes, with resultant economies.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. An improved tilting pad thrust bearing comprising, in combination:
 (a) an annular housing;
 (b) a first series of equalizer plates provided with generally cylindrically curved lower surfaces surmounting a planar surface formed upon the annular housing;
 (c) a second series of equalizer plates surmounting generally cylindrically curved upper surfaces provided upon said first series of equalizer plates;
 (d) said second series of equalizer plates being provided with spherical elements projecting from their upper surfaces;
 (e) a series of bearing shoes pivotally supported upon said spherical elements; and
 (f) an annularly disposed series of removable pins seated within said housing and extending parallel to the axis of said housing and through apertures provided in said first series of equalizer plates, said annularly disposed series of pins also extending through a series of perimetric slots provided in said second series of equalizer plates and in said series of bearing shoes;
 (g) the exposed ends of said removable pins being provided with means for retaining said first and second series of equalizer plates and said series of bearing shoes within said housing.

2. A device according to claim 1,
 (a) each of said equalizer plates and bearing shoes being defined by a pair of concentric arcuate edges and by radial edges;
 (b) the said series of removable pins extending medially of said concentric arcuate edges.

3. A device according to claim 1,
(a) said retaining means including a flange;
(b) said flange extending into a pair of recesses provided upon adjacent bearing shoes;
(c) said flange being in spaced relation with respect to the surfaces of said recesses, thereby permitting inclination of said bearing shoes.

4. A device according to claim 2,
(a) each of said radial edges of said bearing shoes including a recessed portion;
(b) said recessed portion being defined by a planar step and a curved wall extending upright of said step;
(c) said recessed portion being disposed medially of said pair of concentric arcuate edges;
(d) the said retaining means including a flange;
(e) said flange being received within said recessed portion;
(f) said flange being in spaced relation with respect to said planar step and curved wall.

5. A device according to claim 1,
(a) each of said removable pins comprising a slotted tube;
(b) said retaining means including a flange provided with a neck portion;
(c) said neck portion being frictionally engaged with said slotted tube.

6. A device according to claim 1,
(a) each of said removable pins comprising a hollow tube;
(b) said retaining means including a plug provided with a flange and a tubular shank;
(c) said tubular shank including an expanded slotted portion;
(d) said expanded slotted portion being springably urged into contact with the internal periphery of said hollow tube.

7. An improved tilting pad thrust bearing comprising, in combination:
(a) an annular housing;
(b) a first series of equalizer plates surmounting a planar surface formed upon the annular housing;
(c) each of said equalizer plates being provided with a lower surface having an upwardly directed generally cylindrical curvature and an upper surface terminating in a pair of end elements;
(d) each of said end elements having a downwardly directed generally cylindrical curvature;
(e) the axis of said upwardly directed generally cylindrical curvature being aligned radially of the annular housing;
(f) the axes of said curvature of said end elements being parallel to the axis of said upwardly directed generally cylindrical curvature;
(g) a second series of equalizer plates surmounting said end elements in said first series of equalizer plates;
(h) said second series of equalizer plates being provided with spherical elements projecting from their upper surfaces;
(i) a series of bearing shoes pivotally supported upon said spherical elements; and
(j) an annularly disposed series of removable pins seated within said housing and extending parallel to the axis of said housing and through apertures provided in said first series of equalizer plates, said annularly disposed series of pins also extending through a series of perimetric slots provided in said second series of equalizer plates and in said series of bearing shoes;
(k) the exposed ends of said pins being provided with means for retaining said first and second series of equalizer plates and said series of bearing shoes within said housing.

References Cited in the file of this patent

UNITED STATES PATENTS

| | | |
|---|---|---|
| 1,666,521 | Allen | Apr. 17, 1928 |
| 2,102,534 | Howarth | Dec. 14, 1937 |

FOREIGN PATENTS

| | | |
|---|---|---|
| 191,503 | Austria | Aug. 26, 1957 |